S. HUTCHINSON, Jr.

MACHINE-OILER.

No. 7,414. Reissued Dec. 5, 1876.

Witnesses.
S. N. Piper.
L. H. Müller.

Samuel Hutchinson, Jr.
by his attorney
R. M. Eddy.

UNITED STATES PATENT OFFICE.

SAMUEL HUTCHINSON, JR., OF SALEM, MASSACHUSETTS.

IMPROVEMENT IN MACHINE-OILERS.

Specification forming part of Letters Patent No. 164,090, dated June 8, 1875; reissue No. 7,414, dated December 5, 1876; application filed November 24, 1876.

*To all whom it may concern:*

Be it known that I, SAMUEL HUTCHINSON, Jr., of Salem, of the county of Essex and State of Massachusetts, have invented a new and useful Improvement in Machine-Oilers; and do hereby declare the same to be fully described in the following specification and represented in the accompanying drawings, of which—

Figure 1:
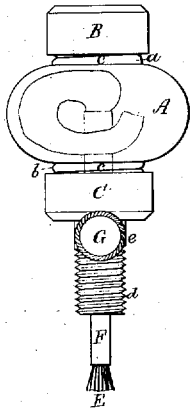
Figure 2:
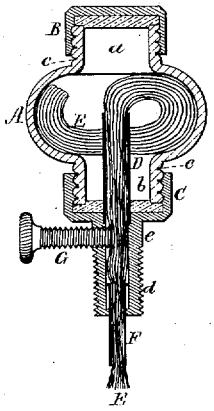

Figure 1 is a front elevation, and Fig. 2 a vertical section, of an oiler embracing my invention.

The said oiler is specially designed for loose pulleys or wheels that revolve on and around a shaft or journal, the oiler being carried around with them, and generally at a very high velocity. In such oilers, while they may be in use, the centrifugal force generated in the wick is so great as to render it very liable to be thrown up or out of the wick-tube, especially when the wick is loose enough in the tube to afford the necessary capillary attraction, which also has to overcome the effect of centrifugal force generated in the oil.

The machine-oiler hereinafter described has to its wick-tube and fastening-neck a separate wick-carrying tube and a clamp-screw, the latter being screwed laterally into the neck and against the wick, and between the wick-tube and the auxiliary tube. The screw thus is made to answer two purposes—viz., to clamp the wick more or less to regulate the flowage of oil, and to serve as a stop to prevent the auxiliary wick-tube and the wick from being thrown back up into the body of the oiler by centrifugal force, while the oiler may be in revolution with a loose pulley.

In the drawings, the body or oil-receiver of the oiler is shown at A as having two tubular necks, *a b*, each being formed with a male screw, *c*, on its periphery, to connect such neck with one of two metallic caps, B C. The upper of these caps B is a close cover. The lower one, C, has a screw-neck, *d*, extending from it, as shown, for fastening the oiler to the hub or box of a pulley or wheel.

From the cap C the main wick-tube D extends up into the reservoir the necessary distance, the wick E being inserted in and through such tube, and also in and through the auxiliary separate movable or adjustable wick-tube F, arranged in and projecting from the neck, in manner as shown.

The clamp-screw G screws into the neck above the shoulder *e* thereof, and against the wick just above the tube F, which is to support the wick, so as to prevent it from being thrown away from the journal by centrifugal force.

Independently of the movable auxiliary wick-tube, the screw G, arranged outside of the reservoir, and to screw into the neck, answers excellent purposes. It operates not only to regulate the flowage of oil, but to hold the wick from being thrown by centrifugal force back into the reservoir, and being arranged wholly outside of the reservoir and its caps, it can be readily got at without the necessity of removing the upper cap.

I claim—

1. A machine-oiler having to its wick-tube D and fastening-neck *d* a separate wick-carrying tube, F, and a clamp-screw, G, arranged in the neck, as set forth.

2. The oil-reservoir or its cap C, provided with the tubular fastening-neck *d*, and the wick-clamp screw G, arranged in such neck, as set forth.

3. The oil-reservoir or its cap C, provided with the wick-tube D and the tubular fastening-neck *d*, and also with the wick-clamp screw G, arranged in said neck, as specified.

4. A machine-oiler composed of the double-necked oil-receiver A, the caps B and C, the wick-tube D, the regulating-screw G, and the tubular fastening-neck *d*, all being essentially as specified.

5. A machine-oiler composed of the double-necked oil-reservoir A, the caps B and C, the wick-tube D, the fastening-neck *d*, the regulating-screw G, and the auxiliary wick-tube F, all being essentially and to operate as specified.

SAML. HUTCHINSON, JR.

Witnesses:
R. H. EDDY,
J. R. SNOW.